(12) United States Patent
Kumar et al.

(10) Patent No.: US 12,136,423 B2
(45) Date of Patent: Nov. 5, 2024

(54) TRANSCRIPT CORRECTION THROUGH PROGRAMMATIC COMPARISON OF INDEPENDENTLY GENERATED TRANSCRIPTS

(71) Applicant: Descript, Inc., San Francisco, CA (US)

(72) Inventors: Kundan Kumar, Montreal (CA); Vicki Anand, Montreal (CA)

(73) Assignee: Descript, Inc., San Francisco, CA (US)

( * ) Notice: Subject to any disclaimer, the term of this patent is extended or adjusted under 35 U.S.C. 154(b) by 181 days.

(21) Appl. No.: 17/127,166

(22) Filed: Dec. 18, 2020

(65) Prior Publication Data

US 2021/0193148 A1 Jun. 24, 2021

Related U.S. Application Data

(60) Provisional application No. 62/953,082, filed on Dec. 23, 2019.

(51) Int. Cl.
| | |
|---|---|
| G10L 15/26 | (2006.01) |
| G06F 3/16 | (2006.01) |
| G10L 15/01 | (2013.01) |
| G10L 15/08 | (2006.01) |
| G10L 15/22 | (2006.01) |
| G10L 15/30 | (2013.01) |
| G10L 15/32 | (2013.01) |

(52) U.S. Cl.
CPC ............ *G10L 15/26* (2013.01); *G06F 3/165* (2013.01); *G10L 15/01* (2013.01); *G10L 15/08* (2013.01); *G10L 15/22* (2013.01); *G10L 15/30* (2013.01); *G10L 15/32* (2013.01); *G10L 2015/088* (2013.01)

(58) Field of Classification Search
CPC ......... G10L 15/01; G10L 15/08; G10L 15/22; G10L 15/26; G10L 15/30; G10L 15/32; G10L 2015/088; G06F 3/165
See application file for complete search history.

(56) References Cited

U.S. PATENT DOCUMENTS

| | | | |
|---|---|---|---|
| 10,147,428 B1 | 12/2018 | Shastry et al. | |
| 10,418,032 B1 | 9/2019 | Mohajer et al. | |
| 11,138,970 B1 * | 10/2021 | Han | G06F 21/6245 |
| 2006/0235696 A1 | 10/2006 | Bennett | |

(Continued)

*Primary Examiner* — Daniel C Washburn
*Assistant Examiner* — Athar N Pasha
(74) *Attorney, Agent, or Firm* — Perkins Coie LLP; Andrew T. Pettit

(57) ABSTRACT

Introduced here are computer programs and associated computer-implemented techniques for facilitating the creation of a master transcription (or simply "transcript") that more accurately reflects underlying audio by comparing multiple independently generated transcripts. The master transcript may be used to record and/or produce various forms of media content, as further discussed below. Thus, the technology described herein may be used to facilitate editing of text content, audio content, or video content. These computer programs may be supported by a media production platform that is able to generate the interfaces through which individuals (also referred to as "users") can create, edit, or view media content. For example, a computer program may be embodied as a word processor that allows individuals to edit voice-based audio content by editing a master transcript, and vice versa.

20 Claims, 14 Drawing Sheets

Mad (man) may be unwittingly changing the world's climate through the waste products of the (his) civilization. There's a group of us now who are proposing that the earth has (is) actually entered a new epoch, and that is the Anthropocene. We know that the enemy is carbon and we know its ugly face (vase). We should put a big fat price on it.

And of course add to that, dropped (drop) the subsidies earth. We broke it, we own it, and nothing is as it was, got (not) the trees, not the seas at (sees) that the forest (forests) farms or fields and not the global economy. That depends on all of these and (an) economy that also admittedly got us into this mess and today () we learn how it can get us out.

(56) References Cited

U.S. PATENT DOCUMENTS

| | | |
|---|---|---|
| 2010/0312555 A1 | 12/2010 | Plumpe et al. |
| 2013/0132079 A1* | 5/2013 | Sehgal .................... G10L 15/22 |
| | | 704/235 |
| 2018/0143956 A1* | 5/2018 | Skarbovsky .......... G06F 40/166 |
| 2018/0197545 A1 | 7/2018 | Willett et al. |
| 2019/0108834 A1* | 4/2019 | Nelson .................... G06N 5/04 |
| 2019/0272902 A1* | 9/2019 | Vozila .................... G06N 20/00 |
| 2019/0341023 A1* | 11/2019 | Ohana .................... G10L 15/02 |
| 2019/0341052 A1* | 11/2019 | Allibhai ................. G06N 3/045 |
| 2019/0378513 A1* | 12/2019 | Carnevale ............... G10L 15/26 |
| 2020/0104672 A1 | 4/2020 | Deselaers et al. |
| 2020/0175961 A1* | 6/2020 | Thomson ................ G10L 15/28 |
| 2020/0175987 A1 | 6/2020 | Thomson et al. |
| 2020/0286476 A1* | 9/2020 | Abdulkader ............ G10L 15/01 |
| 2021/0056960 A1* | 2/2021 | Howard ................ G06F 40/279 |
| 2021/0074277 A1* | 3/2021 | Lewis .................... G06F 3/013 |
| 2021/0183373 A1* | 6/2021 | Moritz ................... G06N 3/045 |
| 2021/0193148 A1 | 6/2021 | Kumar et al. |

* cited by examiner

Mad (man) may be unwittingly changing the world's climate through the waste products of the (his) civilization. There's a group of us now who are proposing that the earth has (is) actually entered a new epoch, and that is the Anthropocene. We know that the enemy is carbon and we know its ugly face (voice) We should put a big fat price on it.

And of course add to that, dropped (drop) the subsidies earth. We broke it, we own it, and nothing is as it was, got (not) the trees, not the seas at (seas that) the forest (forests) farms or fields and not the global economy. That depends on all of these and (an) economy that also admittedly got us into this mess and today () we learn how it can get us out.

FIGURE 5

TRANSCRIPT CORRECTION THROUGH PROGRAMMATIC COMPARISON OF INDEPENDENTLY GENERATED TRANSCRIPTS

CROSS-REFERENCE TO RELATED APPLICATIONS

This application claims priority to U.S. Provisional Application No. 62/953,082, titled "Transcript Correction Flow Through Comparison of Independently Generated Transcripts" and filed on Dec. 23, 2019, which is incorporated by reference herein in its entirety.

TECHNICAL FIELD

Various embodiments concern computer programs and associated computer-implemented techniques for facilitating the correction of a master transcript through the comparison of multiple independently generated transcripts.

BACKGROUND

Digital audio workstations (DAWs) are designed for recording and/or producing audio files, such as songs, speech, and sound effects. DAWs come in a wide variety of configurations, from a computer program executing on a computing device (e.g., a personal computer) to a highly complex configuration of hardware components that are controlled by a computing device. Those hardware components may include audio input devices (e.g., microphones) and audio output devices (e.g., speakers).

DAWs historically included a mixing console, a control surface, an audio converter, and a storage medium that were located in a single computing device. These hardware-implemented DAWs were more popular before personal computers became powerful enough to run the resource-intensive software needed to edit audio files. Now, the term "DAW" may simply refer to editing-focused computer programs. A computing device capable of executing one of these computer programs will normally include either a sound card or an audio interface, as well as at least one input component for modifying the audio files. Examples of input components include computer mice, MIDI keyboards (also referred to as "controller keyboards"), automated fader boards for mixing track volumes, and the like. The computing device can act as a host for the sound card or the audio interface, while the computer program can provide the interfaces (and support the functionalities) through which audio files can be edited. While software-implemented DAWs have extensive recording, editing, and playback capabilities, these DAWs are intended to be used by experts (also referred to as "audio professionals").

BRIEF DESCRIPTION OF THE DRAWINGS

FIG. 5 includes an example of a master transcript generated based on multiple transcripts produced by different transcription services.

Figure 1:
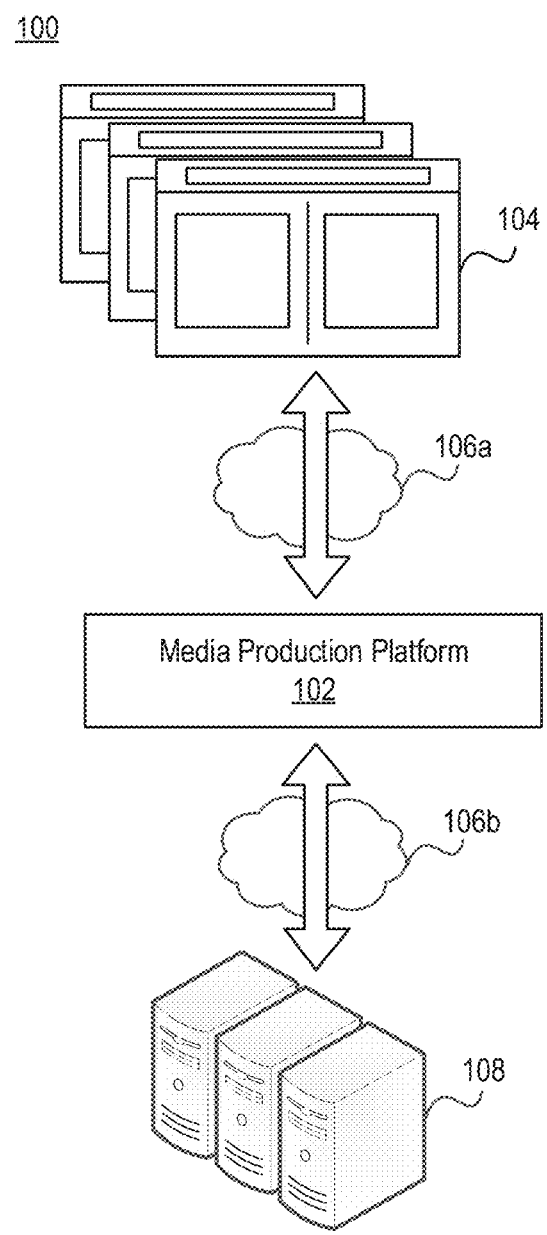
FIG. 1 illustrates a network environment that includes a media production platform responsible for creating the interfaces through which individuals (also referred to as "users" or "developers") can produce media content.

Various features of the technology described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION

The term "speech recognition" refers to an interdisciplinary field of computational linguistics concerned with the methodologies/technologies related to the translation of spoken language into text. Some speech recognition systems (also referred to as "speech-to-text (STT) systems") require training, where a speaker reads text and/or isolated vocabulary into the system. Such systems will analyze these samples to fine-tune its ability to recognize the speech uttered by the speaker, thereby resulting in increased accuracy. Speech recognition systems that require training are referred to as "speaker-dependent systems," while speech recognition systems that do not require training are called "speaker-independent systems."

Speech recognition can be applied in a variety of different contexts, including voice dialing, call routing, domotic appliance control, search, data entry, and the like. For example, speech recognition has become popular in the context of word processing programs (also referred to as "word processors"). The term "word processor," as used herein, refers to a computer program that is able to provide for inputting, editing, formatting, and outputting of text. U.S. Pat. No. 10,445,052, titled "Platform for Producing and Delivering Media Content" and incorporated by reference herein in its entirety, illustrates how text generated through speech recognition may be examined through a word processor as part of a content development process.

Despite significant improvements in speech recognition, STT systems still struggle to accurately convert some speech into text. For example, the accuracy of speech recognition may be impacted by the following:

Error rates that increase as vocabulary size grows (e.g., vocabulary sizes of 200, 5,000, and 100,000 words have been shown to have error rates up to 3%, 7%, and 45%, respectively);

Difficulty in recognizing confusable words (e.g., the words including the "e-set" of letters—B, C, D, E, G, P, T, V, Z);

Difficulty in determining whether spoken words are separated by silences, namely, establishing whether speech is isolated, discontinuous, or continuous;

Grammar-based constraints such as the difficulty of recognizing spontaneous speech due to disfluencies, unexpected vocabulary, and improper usage of vocabulary;

Environment-based constraints such as noise and acoustical distortions (e.g., echoes and room acoustics); and Improper pronunciations and/or sequences of spoken words.

Inaccuracies resulting from improper speech recognition can be problematic, especially as speech recognition is utilized for increasingly important and time-sensitive tasks.

Introduced here, therefore, are computer programs and associated computer-implemented techniques for facilitating the creation of a master transcript that more accurately reflects underlying audio by comparing multiple independently generated transcripts. The master transcript may be used to record and/or produce various forms of media content, as further discussed below. Thus, the technology described herein may be used to facilitate editing of text content, audio content, or video content. These computer programs may be supported by a media production platform that is able to generate the interfaces through which individuals (also referred to as "users") can create, edit, or view media content. For example, a computer program may be embodied as a word processor that allows individuals to edit voice-based audio content by editing a master transcript, and vice versa.

Several of the interfaces discussed herein allow different media formats (e.g., audio and text) to be aligned for post-processing. To facilitate post-processing, the media production platform may dynamically link files associated with different media formats to one another. Such an approach allows edits to be more easily carried throughout the files. For example, when an individual modifies a master transcript corresponding to an audio file (e.g., by copying and then pasting a segment of the master transcript to a different location), the media production platform may cause the modification to be reflected globally. That is, the media production platform may cause similar or identical modifications to be made to the audio file.

Embodiments may be described with reference to particular computer programs, networks, content, etc. However, those skilled in the art will recognize that these features are equally applicable to other types of computer programs, networks, content, etc. For example, while embodiments may be described in the context of a computer program implemented on a network-accessible server system, the relevant features may be similarly applicable to computer programs implemented on computing devices such as mobile phones, tablet computers, or personal computers.

Note that while embodiments may be described in the context of computer-executable instructions for the purpose of illustration, aspects of the technology can be implemented via hardware, firmware, or software. As an example, a media production platform may be embodied as a computer program operable to acquire an audio file, provide the audio file to multiple transcription services, receive a separate transcript from each of the multiple transcription services, and then produce a metric indicative of transcription accuracy by programmatically comparing the multiple transcripts.

Terminology

References in this description to "an embodiment" or "one embodiment" means that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, firmware components, and/or hardware components. Modules are typically functional components that generate output(s) based on specified input(s). A computer program may include one or more modules. Thus, a computer program may include multiple modules responsible for completing different tasks or a single module responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

FIG. 1 illustrates a network environment 100 that includes a media production platform 102. Individuals (also referred to as "users" or "developers") can interact with the media production platform via interfaces 104 as further discussed below. For example, individuals may be able to generate, edit, or view media content through the interfaces 104. Examples of media content include text content such as stories and articles, audio content such as radio segments and podcasts, and video content such as television programs and presentations. Meanwhile, the individuals may be persons interested in recording media (e.g., audio content), editing media (e.g., to create a podcast or an audio tour), etc.

As shown in FIG. 1, the media production platform 102 may reside in a network environment 100. Thus, the computing device on which the media production platform 102 is executing may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the computing device can be communicatively coupled to other computing device(s) over a short-range wireless connectivity technology, such as Bluetooth®, Near Field Communication (NFC), Wi-Fi® Direct (also referred to as "Wi-Fi P2P"), and the like. As an example, the media production platform 102 is embodied as a "cloud platform" that is at least partially executed by a network-accessible server system in some embodiments. In such embodiments, individuals may access the media production platform 102 through computer programs executing on their own computing devices. For example, an individual may access the media production platform 102 through a mobile application, desktop application, over-the-top (OTT) application, or web browser. Accordingly, the interfaces 104 may be viewed on personal computers, tablet computers, mobile phones, wearable electronic devices (e.g., watches or fitness accessories), network-connected ("smart") electronic devices (e.g., televisions or home assistant devices), gaming consoles, or virtual/augmented reality systems (e.g., head-mounted displays).

In some embodiments, at least some components of the media production platform 102 are hosted locally. That is, part of the media production platform 102 may reside on the computing device used to access the interfaces 104. For example, the media production platform 102 may be embodied as a desktop application executing on a personal computer. Note, however, that the desktop application may be communicatively connected to a network-accessible server system 108 on which other components of the media production platform 102 are hosted.

In other embodiments, the media production platform 102 is executed entirely by a cloud computing service operated by, for example, Amazon Web Services® (AWS), Google Cloud Platform™, or Microsoft Azure®. In such embodiments, the media production platform 102 may reside on a network-accessible server system 108 comprised of one or more computer servers. These computer servers can include media and other assets, such as processing operations, heuristics (e.g., rules) for comparing transcripts, and the like. Those skilled in the art will recognize that this information could also be distributed amongst a network-accessible server system and one or more computing devices. For example, media may be stored on a personal computer that is used by an individual to access the interfaces 104 (or another computing device, such as a storage medium, accessible to the personal computer) while processing operations may be stored on a computer server that is accessible to the personal computer via a network.

As further discussed below, the media production platform 102 can facilitate transcript-driven production of media content. The individual may be able to alter an audio file by modifying a corresponding transcript that is viewable through one of the interfaces 104, or vice versa. For example, if the individual inserts an audio file into a transcript, the media production platform 102 may cause the audio file to be added to the underlying audio file corresponding to the transcript.

Moreover, the media production platform 102 may be able to automatically modify media content on behalf of the individual. Thus, the media production platform 102 could create and/or modify a timeline that is associated with a media-based experience (also referred to as a "content-based experience") based on implicit actions and/or explicit actions of a person participating in the experience (also referred to as a "consumer"). For example, the media production platform 102 may intelligently add, remove, or modify media content in a guided audio tour as a consumer progresses through the guided audio tour. Other examples of content-based experiences include audiobooks, presentations, radio segments, video segments, video games, and the like.

Figure 2:
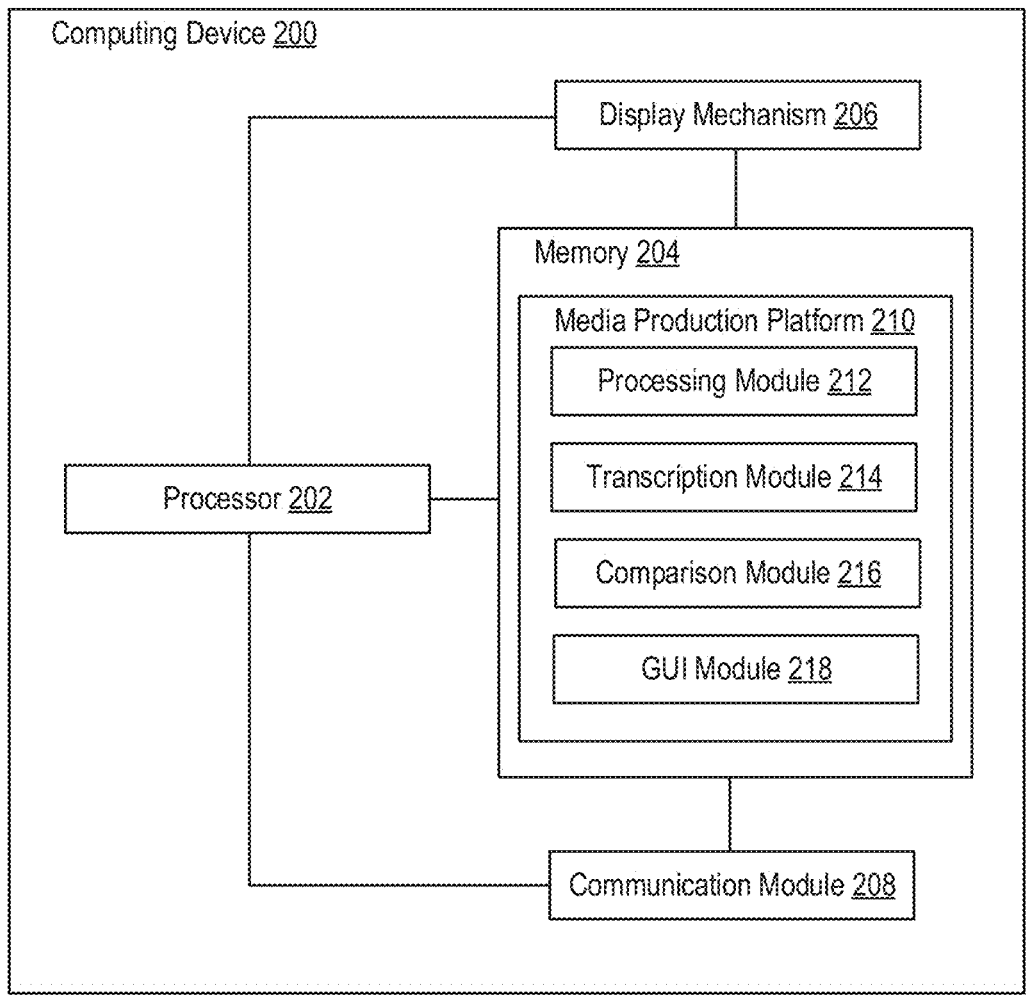
FIG. 2 illustrates an example of a computing device able to implement a media production platform through which individuals may be able to record, produce, deliver, or consume media content.

FIG. 2 illustrates an example of a computing device 200 able to implement a media production platform 210 through which individuals may be able to record, produce, deliver, or consume media content. For example, in some embodiments the media production platform 210 is designed to generate interfaces through which developers can generate or produce media content, while in other embodiments the media production platform 210 is designed to generate interfaces through which consumers can consume media content. In some embodiments, the media production platform 210 is embodied as a computer program that is executed by the computing device 200. In other embodiments, the media production platform 210 is embodied as a computer program that is executed by another computing device (e.g., a computer server) to which the computing device 200 is communicatively connected. In such embodiments, the computing device 200 may transmit relevant information, such as transcripts, to the other computing device for processing. Those skilled in the art will recognize that aspects of the computer program could also be distributed amongst multiple computing devices.

The computing device 200 can include a processor 202, memory 204, display mechanism 206, and communication module 208. The communication module 208 may be, for example, wireless communication circuitry designed to establish communication channels with other computing devices. Examples of wireless communication circuitry include integrated circuits (also referred to as "chips") configured for Bluetooth, Wi-Fi, NFC, and the like. The processor 202 can have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the media production platform 210). Note that the memory 204 is merely an abstract representation of a storage environment. The memory 204 could be comprised of actual memory chips or modules.

The communication module 208 can manage communications between the components of the computing device 200. The communication module 208 can also manage communications with other computing devices. Examples of computing devices include mobile phones, tablet computers, personal computers, and network-accessible server systems comprised of computer server(s). For instance, in embodiments where the computing device 200 is associated with a developer, the communication module 208 may be communicatively connected to a network-accessible server system on which processing operations, heuristics, and algorithms for producing media content are stored. In some embodiments, the communication module 208 facilitates communication with one or more third-party services that are responsible for providing specified services (e.g., transcription). The communication module 208 may facilitate communication with these third-party services through the use of application programming interfaces (APIs), bulk data interfaces, etc.

For convenience, the media production platform 210 may be referred to as a computer program that resides within the memory 204. However, the media production platform 210 could be comprised of software, firmware, or hardware components implemented in, or accessible to, the computing device 200. In accordance with embodiments described herein, the media production platform 210 may include a processing module 212, transcription module 214, comparison module 216, and graphical user interface (GUI) module 218. These modules may be an integral part of the media production platform 210. Alternatively, these modules may be logically separate from the media production platform 210 but operate "alongside" it. Together, these modules may enable the media production platform 210 to generate the interfaces through which an individual can view, edit, and compare transcripts.

The processing module 212 may be responsible for ensuring that data obtained and/or generated by the media production platform 200 is in a format suitable for the other modules. Thus, the processing module 212 may apply operations to alter media content acquired by the media production platform 210. For example, the processing module 212 may apply denoising, filtering, and/or compressing operations to media content acquired by the media production platform 210. As noted above, media content could be acquired from one or more sources. The processing module 210 may be responsible for ensuring that these data are in a compatible format, temporally aligned, etc.

In some embodiments, the transcription module 214 is configured to generate a transcript upon receiving an audio file as input. In such embodiments, the transcription module 214 may be programmed to perform conversation analysis (e.g., narrow transcription in which details on conversational interactions are discovered, or broad transcription in which these details are ignored), Jefferson notation, discourse transcription, etc. Accurate transcription may require that the transcription module 214 model the spoken language in the audio file using one or more statically-based speech recognition algorithms. Such modeling may be accomplished using Hidden Markov Models (HMMs), which output a sequence of symbols or quantities. HMMs are popular in speech recognition because most speech samples can be viewed as piecewise stationary signals or short-time stationary signals, and because HMMS can be automatically trained and are therefore simple (e.g., computationally straightforward) to use. However, other approaches could be taken. For example, embodiments of the transcription module 214 may employ artificial neural networks (e.g., deep neural networks), dynamic time warping, Connectionist Temporal Classification (CTC), etc.

In other embodiments, the transcription module 214 is configured to generate a master transcript based on multiple independently generated transcripts. For example, upon receiving an audio file as input, the media production platform 210 may forward the audio file to multiple transcription services via corresponding APIs accessible to the communication module 208.

Then, the comparison module 216 can compare the transcripts received from these transcription services to generate a master transcript, as further discussed below. In some embodiments, this is done with the assistance of an individual, for example, who is responsible for identifying the correct segment if corresponding segments of the multiple transcripts conflict. In other embodiments, this is done by employing a computer-implemented model (or simply "model") trained to identify and then resolve inconsistencies between the multiple transcripts.

The GUI module 218 may be responsible for generating the interfaces through which individuals can interact with the media production platform 210. As shown in FIGS. 3A-G, these interfaces may include visual indicia representative of the audio files that make up a content-based experience, or these interfaces may include a transcript that can be edited to globally effect changes to a content-based experience. For example, if an individual deletes a segment of a transcript that is visible on an interface, the media production platform 210 may automatically delete a corresponding segment of audio content from an audio file associated with the transcript.

FIGS. 3A-G depict examples of interfaces that enable an individual to readily produce high-quality media content. These interfaces, which are created by a media production platform, may enable nearly anyone who understands how to use a word processor to produce media content that is suitable for professional applications.

Figure 3A:
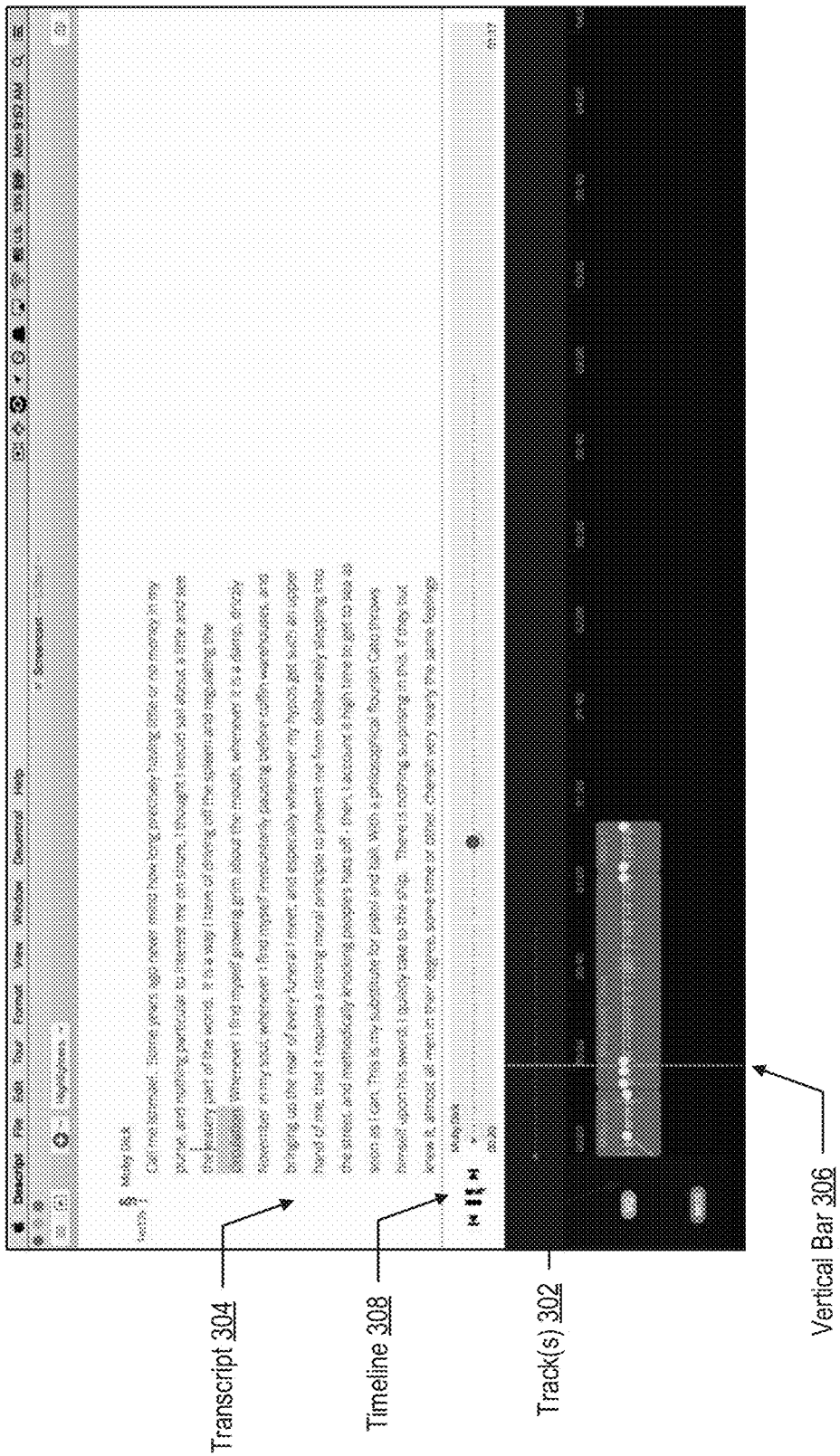
FIG. 3A depicts an example of an interface that includes multiple windows for producing media content.

Moreover, the media production platform can support powerful features that can be used to create media content, incorporate consumer feedback, and ensure these interfaces are readily comprehensible and easy to use. Examples of media content include location-based experiences involving audio content and/or video content, podcasts, audiobooks, radio segments, television segments, presentations, etc. These powerful features are enabled by higher-level, content-based editing tools rather than the lower-level, waveform-based editing tools used by conventional DAWs. The media production platform may also be designed to facilitate simultaneous collaboration between multiple developers, as well as multiple consumers who may simultaneously consume media content produced by those developers. As shown in FIG. 3A, an interface may include multiple windows for producing media content. Production may involve creating and/or editing media content. For example, one or more tracks 302 corresponding to audio file(s) could be presented in one window, while a transcript 304 of words recognized in the audio file(s) could be presented in another window. The track(s) 302 may be separately or collectively editable.

The media production platform may also be able to intelligently switch between multiple tracks based on whether certain criteria are satisfied, much like a video game engine. For example, the media production platform may determine whether certain condition(s) are met for playing a particular audio file. As another example, the media production platform may determine whether an individual has begun editing a portion of the transcript corresponding to a particular audio file.

Interfaces with multiple windows can easily align media content for post-processing, editing, etc. Alignment can also be permitted between media content of different formats (e.g., audio and text). For example, when an individual modifies a transcript (e.g., by copying a segment of a transcript and pasting it to a different location), the media production platform may cause the change to be reflected globally. That is, the media production platform may effect an identical or similar modification to an audio file associated with the transcript. Such action may be performed periodically or continually. For example, the media production platform may continually monitor the transcript (or the corresponding audio file) for changes so long as available bandwidth and/or connectivity status meets a specified threshold. Should these measure(s) fall below the specified threshold, the media production platform may periodically query whether any modifications have been made to the transcript (or the corresponding audio file).

In some embodiments, visual cues are used to indicate the current position in the transcript 304 and/or the track(s) 302. Here, for example, the media production platform has highlighted the word corresponding to the current position in the transcript and created a vertical bar 306 that overlays the track(s) 302. Other examples of visual cues include underlining the word corresponding to the current position, changing the color of the word corresponding to the current position, and placing an animated feature (e.g., a moving sphere) near the word corresponding to the current position. A timeline 308 may indicate the total duration of the media content, as well as provide a visual representation of progress.

Figure 3B:
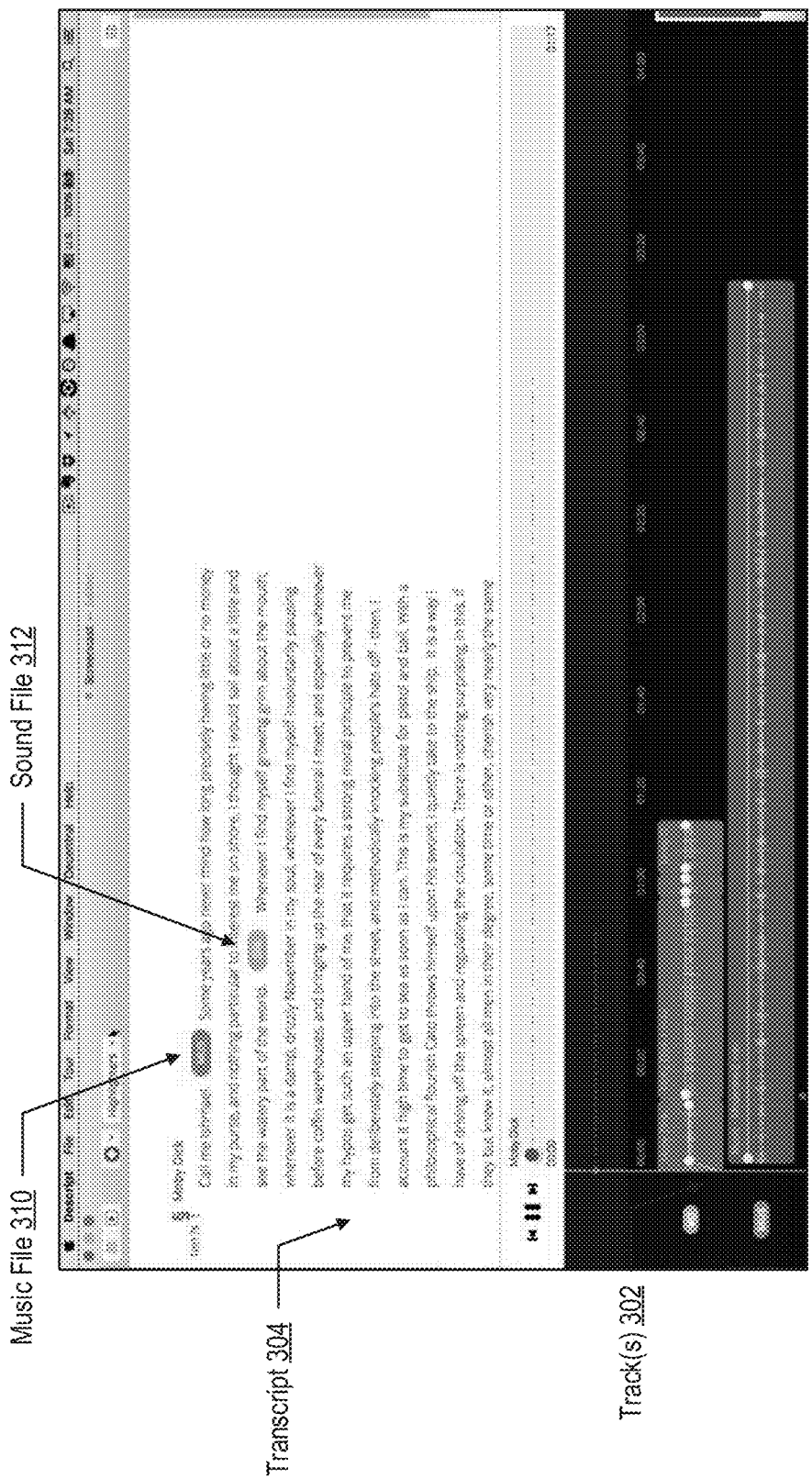
FIG. 3B depicts an example of an interface that may facilitate in-line, multi-track sequencing of the content within windows shown on the interface.

As shown in FIG. 3B, an interface may also facilitate in-line, multi-track sequencing of the media content in the windows shown on the interface. In some embodiments, all of the windows on the interface are dynamically linked together (e.g., on a phoneme level or a word level). In other embodiments, only some of the windows on the interface are dynamically linked together. Various mechanisms, such as a drag-and-drop mechanism, may allow audio files to be selected/placed directly where an individual would like the sound to play. Here, for example, a music file 310 has been placed in the transcript 304 such that the music will begin playing after the word "Ishmael" has been uttered. Similarly, a sound file 312 has been placed in the transcript 304 such that the sound effect will begin playing after the word "world" has been uttered.

After an audio file has been placed in the transcript 304, a waveform corresponding to the audio file may be automatically placed along one of the track(s) 302 in the waveform window. When the audio file is moved within the transcript 304 (e.g., due to being dragged from one location to another location), the media production platform can ensure that the corresponding waveform moves along the track as well. As noted above, the transcript 304 and the audio file(s) arranged along the track(s) 302 are normally synced with one another so that changes made to one can be propagated across the other by the media production platform in real time.

An individual may be able to separately edit the audio file(s) arranged along the track(s) 302 from within the waveform window. For example, the individual may be able to modify the duration of an audio file (e.g., by cutting material), set fades, and perform other operations without leaving the interface.

Figure 3C:
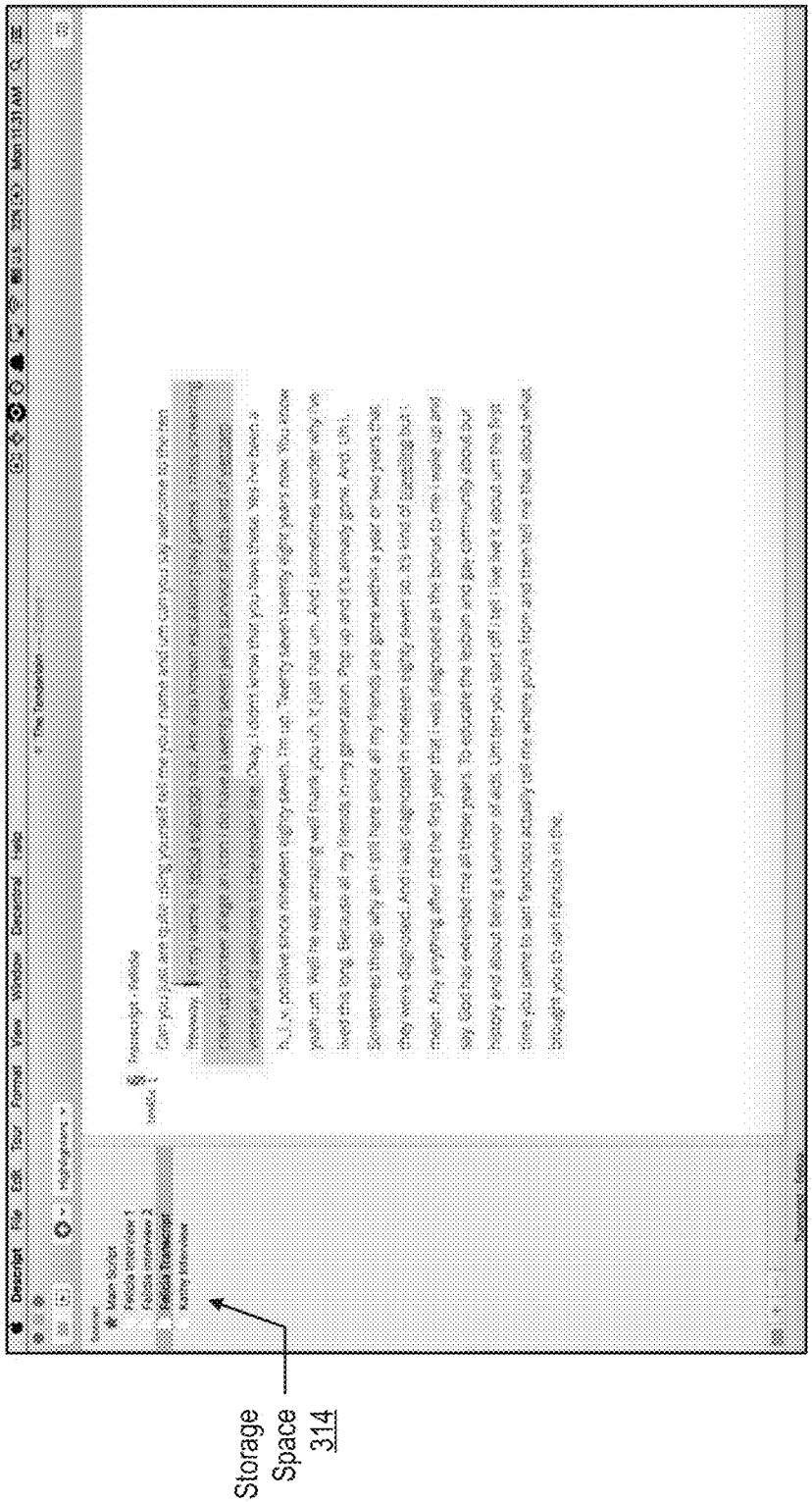
FIG. 3C illustrates how files can be stored as separate documents in a storage space.

As shown in FIG. 3C, files can be stored as separate documents within a storage space 314 (also referred to as a "workspace"). Examples of files include text files (e.g., transcripts), audio files (e.g., voiceover recordings), and video files. In some embodiments, the storage space 314 is associated with a particular project/experience. Accordingly, only those files related to the particular project/experience may be shown within the storage space 314. Here, for example, four separate files (i.e., Felicia Interview 1, Felicia Interview 2, Felicia Transcript, and Kathy Interview) are associated with a single project, namely, a guided audio tour of the Tenderloin neighborhood of San Francisco, Calif. The four separate files include three audio files (i.e., Felicia Interview 1, Felicia Interview 2, and Kathy Interview) and one text file (i.e., Felicia Transcript).

An individual could manually associate an audio file with a preexisting transcript when the audio file is uploaded to the media production platform. Alternatively, the media production platform could automatically associate an audio file with a preexisting transcript based on, for example, a comparison of words recognized in the audio file to a series of preexisting transcripts. As noted above, the media production platform may automatically generate a transcript responsive to receiving the audio file and then post the transcript to the interface for review by the individual. For example, the media production platform may create a transcript upon determining that a transcript does not already exist for an acquired audio file. If a transcript is uploaded to the media production platform (or written using the interface) and no corresponding audio file(s) exist, the media production platform may automatically generate voice-like scratch audio that can be used to test aspects of a project/experience, such as expected runtime, flow, etc.

Figure 3D:
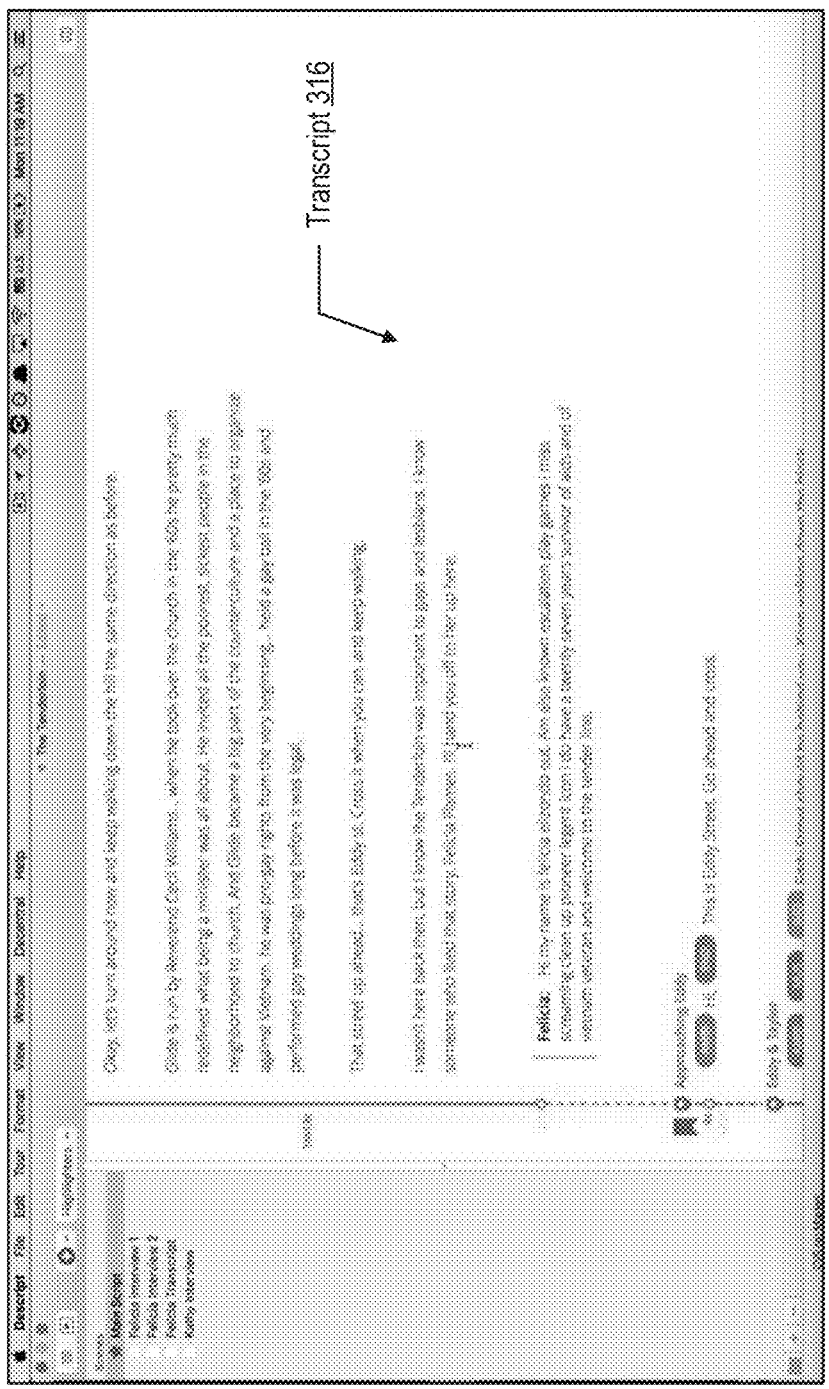
FIG. 3D illustrates how an individual can select a segment of a transcript for the purpose of altering the corresponding audio waveform.
Figure 3E:
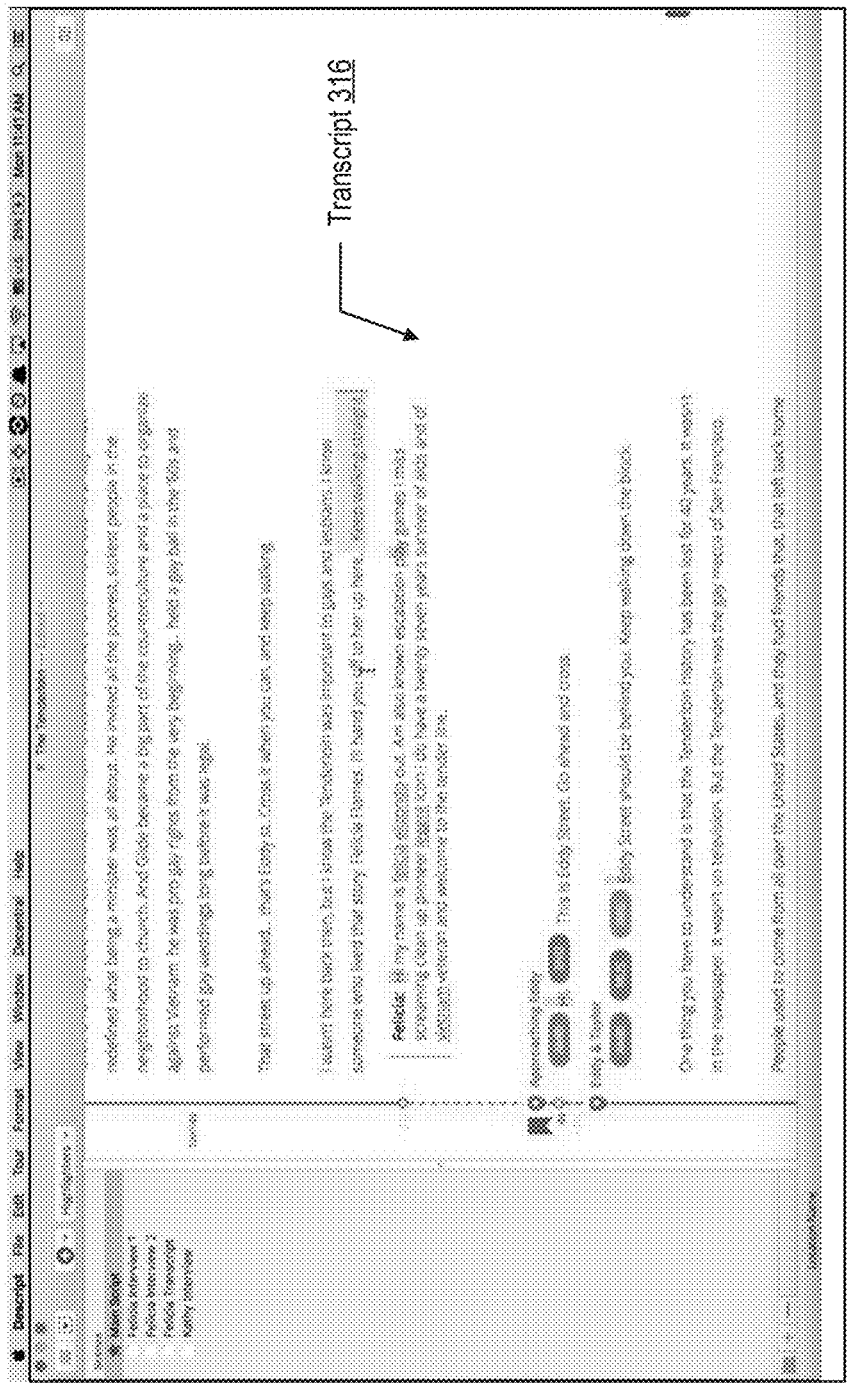
FIG. 3E illustrates how an individual can copy a segment of a transcript and then paste the copied segment into another transcript, another location in the transcript, etc.

Each file accessible to the media production platform may be independently editable using the interfaces shown in FIGS. 3A-G. However, an individual may also be able to easily switch between various files while producing a project/experience. As shown in FIGS. 3D-E, the individual could select a segment of a transcript 316 (e.g., by selecting a portion of the transcript 316 or the corresponding audio waveform), copy the segment, and then paste the segment into another transcript, another location in the transcript 316, etc.

Corresponding media content may also be transferred based on the single action performed by the individual. For example, the selection of the segment of the transcript 316 may prompt the media production platform to create an audio segment by clipping a source audio file. If the individual copies segments of a first transcript and then pastes the segments into a second transcript, corresponding portions of a first audio file associated with the first transcript may be used to form a second audio file associated with the second transcript.

Such granular modification of the text/audio is enabled by precisely aligning the transcript and corresponding audio file(s). Alignment may occur during pre-processing of the audio file(s), generating of the transcript, etc. When an audio file is provided to the media production platform (e.g., by uploading the audio file through the interface), various speech recognition processes can be performed that enable words spoken in the audio file to be converted into text.

Accordingly, the media production platform may be able to automatically align audio file(s) uploaded by an individual with a preexisting transcript by detecting the presence of certain words/phrases. These words/phrases may be referred to as "keywords" or "keyphrases" as they enable alignment to be accomplished much more easily. In some embodiments, the media production platform is able to automatically stack multiple utterances of the same phrase upon detecting a single occurrence of the phrase in the preexisting transcript. That is, a speaker may be able to record one or more takes over a preexisting script. Multiple occurrences of the same phrase are often indicative of multiple takes of the same line of dialogue by a voice actor. The media production platform may be configured to facilitate the initiation of playback of the multiple takes, the selection of a given take, etc.

The media production platform can create a transcript based on the spoken words recognized in an audio file. Moreover, the media production platform can parse the recognized words and align the words with the corresponding portions of the audio file on a phoneme level or a word level. Consequently, audio waveforms can be readily modified by the media production platform based on changes to the transcript, and vice versa. Note, however, that even if the transcript is not identical to the audio file (e.g., the transcript includes errors, or the speaker has not uttered words in the transcript), alignment can still be performed to determine a best fit for the audio file within the transcript based on context.

As shown in FIG. 3E, individuals may be able to modify the transcript 316 directly. Here, an individual has added text ("Keep walking straight.") directly into the transcript 316. In some embodiments, modifications to the transcript 316 are visually highlighted in some manner. For example, newly added text may be highlighted in a particular color to indicate that audio must still be recorded for that text. In such instances, if the individual elects to play the transcript (e.g., for testing purposes), a voice generator program may read the newly added text so as to not interrupt the flow of the content-based experience. Examples of modifications include additions of new text, removals of existing text, and changes to existing text.

Figure 3F:
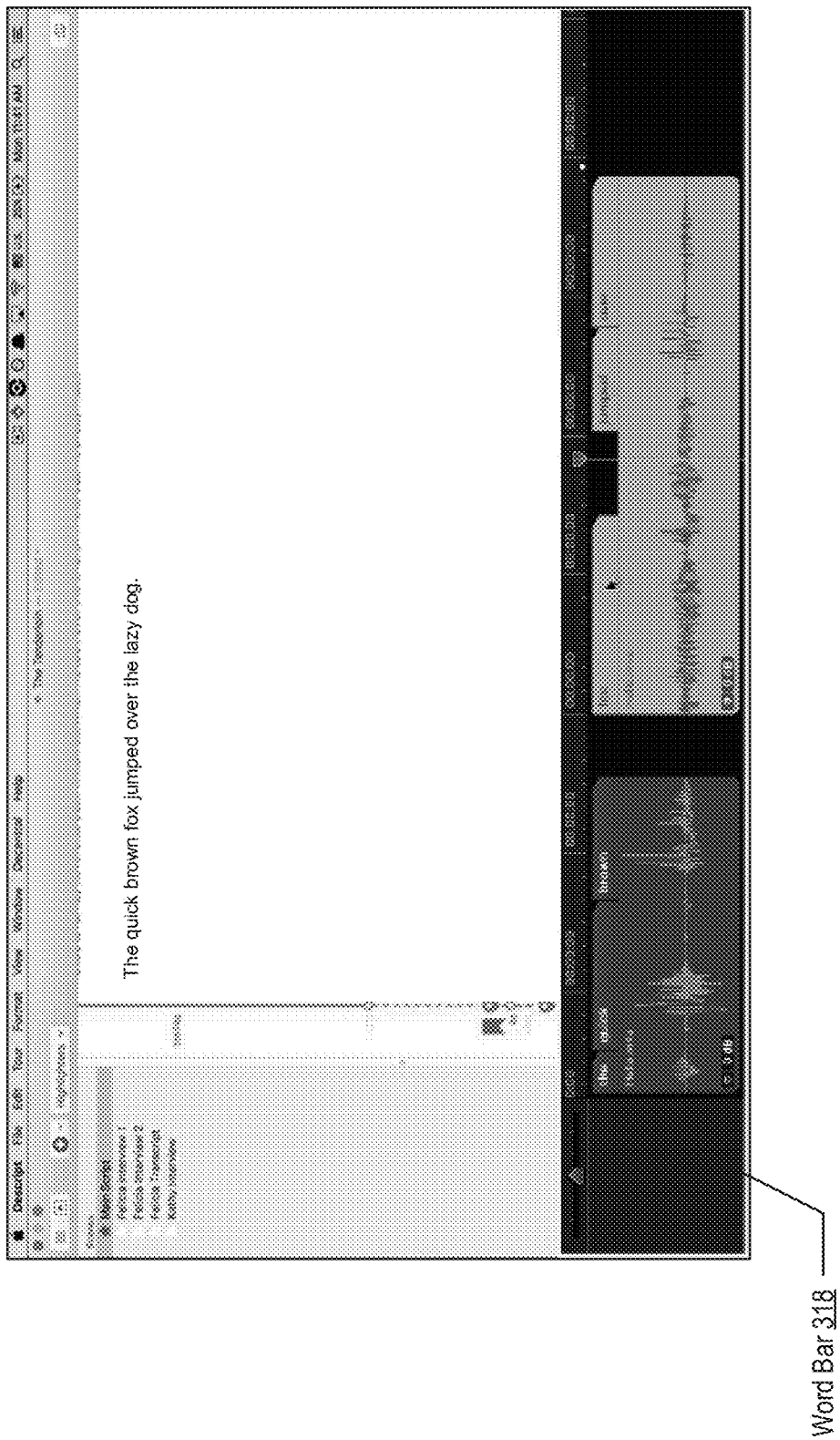
FIG. 3F depicts an example of an interface that includes a word bar, which allows an individual to directly manipulate words via a waveform editor window.

As shown in FIG. 3F, some interfaces include a word bar 318 that visually represents the individual words in an audio file. The media production platform may automatically populate the word bar 318 after parsing the audio file to recognize spoken words. Each word in the word bar 318 may be aligned with a corresponding portion of an audio waveform corresponding to the audio file and/or a timeline. Individuals may be able to directly manipulate the audio file by manipulating the word(s) in the word bar 318, eliminate gaps in the audio file by manipulating the audio waveform, create gaps in the audio file by manipulating the audio waveform, etc. Multiple voices that are simultaneously speaking in an audio file (or a video file) may be separately shown using script section blocks. Such a scenario may be referred to as "crosstalk."

Figure 3G:
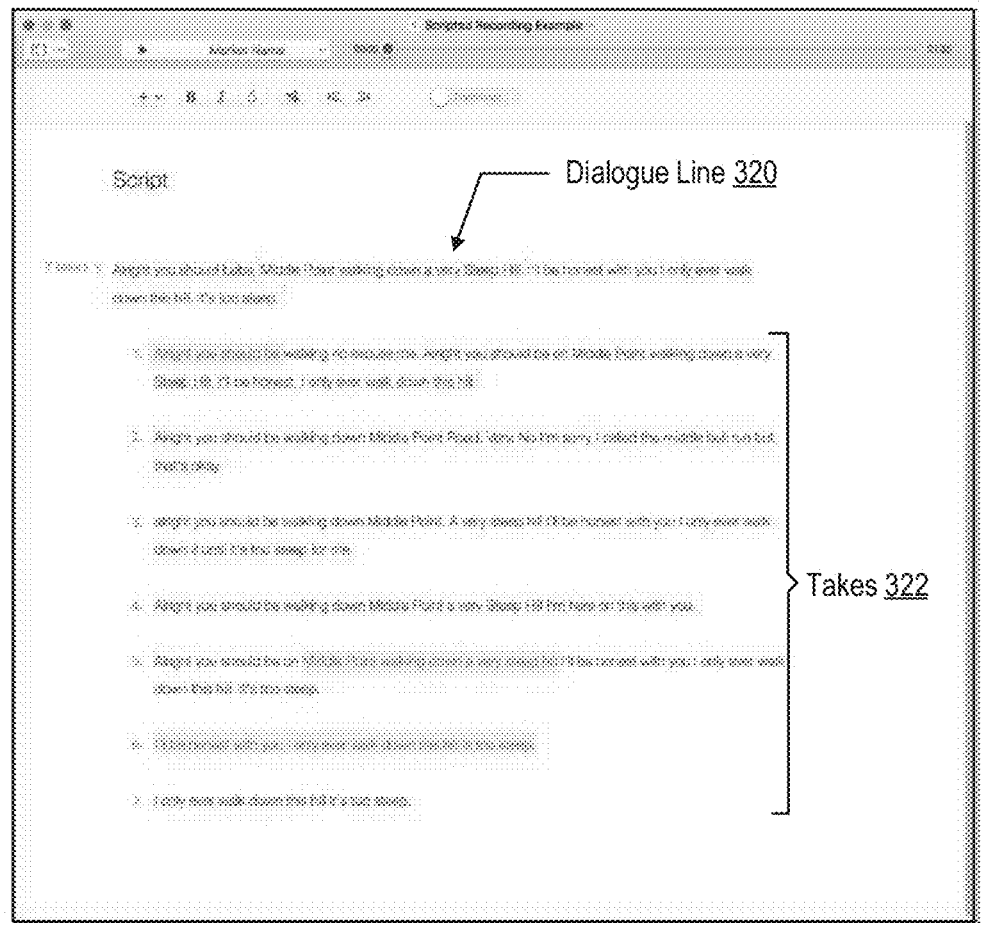
FIG. 3G illustrates how multiple takes of the same line of dialogue may be separately shown and numbered.

As shown in FIG. 3G, multiple takes of the same line of dialogue may be displayed in a similar manner. Here, for example, there are seven different takes 322 of a line of dialogue 320. These takes 322 are contemporaneous in nature. That is, all of the takes occur at the same point in time during a content-based experience. Accordingly, a consumer of the content-based experience will likely only experience a single take. However, developers may want to see how the different takes affect flow, runtime, etc.

Playhead(s) may be used to represent position while producing, reviewing, or viewing media content. For example, in some embodiments, multiple playheads are used for those takes that share words/phrases in common. While playheads are normally illustrated as vertical lines embedded within the text, other visual indicia may be used. For example, words may be highlighted in a particular color as they are presented during playback of a take by the media production platform.

Overview of Transcript Correction Through Programmatic Comparison

Figure 4:
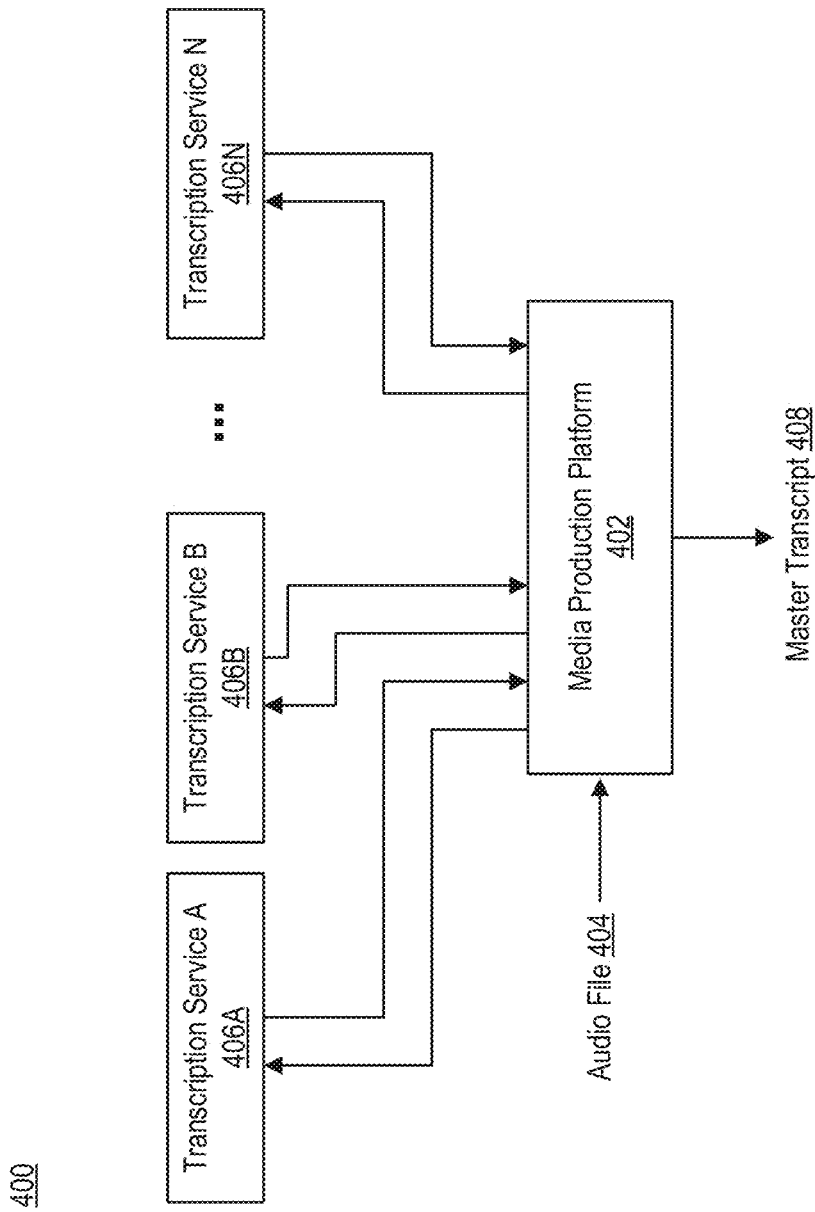
FIG. 4 depicts an example of a communication environment that includes a media production platform configured to generate a master transcript for an audio file.

FIG. 4 depicts an example of a communication environment 400 that includes a media production platform 402 configured to generate a master transcript for an audio file 404. In some embodiments, the audio file 404 is manually uploaded to the media production platform 402 by an individual through an interface. In other embodiments, the audio file 404 is automatically retrieved by the media production platform 402 from a storage medium. The storage medium could be located on the same electronic device as the media production platform 402. For example, if the media production platform 402 resides on a personal computer, then the media production platform 402 may examine a given location in the memory of the personal computer to see whether any audio files are present. Alternatively, the storage medium could be located on a different electronic device than the media production platform 402. For example, if the media production platform 402 resides on a computer server, then the media production platform 402 may examine a given location in the memory of another electronic device, such as a personal computer or a mobile phone, that is accessible to the computer server across a network.

The media production platform 402 can be communicatively coupled to one or more transcription services. Here, the media production platform is communicatively coupled to "N" number of transcription services (i.e., Transcription Service A 406A, Transcription Service B 406B, . . . , Transcription Service N 406N). Generally, the media production platform 402 will communicate with each transcription service via a dedicated API. Accordingly, the media production platform 402 may initiate separate connections with a first API via which it can communicate with Transcription Service A 406A, a second API via which it can communicate with Transcription Service B 406B, etc. Examples of transcription services include Google Cloud Speech-to-Text, Google Cloud Video Intelligence, Amazon Transcribe, Microsoft Azure Cognitive Speech Service, IBM Watson Speech to Text, Rev.ai, Scribie Audio and Video Transcription, etc.

In some embodiments, rather than utilize multiple transcription services to generate transcripts, the media production platform 402 instead employs multiple models designed and then trained for speech recognition to generate the transcripts. These models may be referred to as "speech-to-text models" or "STT models." For example, the media production platform 402 may provide, as input, a first copy of the audio file 404 to a first STT model to obtain a first transcript. Moreover, the media production platform 402 may provide, as input, a second copy of the audio file 404 to a second STT model to obtain a second transcript. The first and second transcripts can then be compared as discussed above. The first and second STT models may be built differently (e.g., with different algorithms, feedback mechanisms, etc.) and/or trained differently (e.g., with different text corpuses).

As shown in FIG. 4, the media production platform 402 can forward copies of the audio file 404 to the multiple transcription services 406A-N for transcription. Thus, the media production platform 402 can forward a first copy of the audio file 404 to Transcription Service A 406A, a second copy of the audio file 404 to Transcription Service B 406B, etc. Thereafter, the media production platform 402 will receive a transcription of words recognized in the audio file 404 from each transcription service. Accordingly, if the media production platform 402 forwards copies of the audio file 404 to "N" number of transcription services, then the media production platform 402 will receive "N" number of transcripts.

As further discussed below, the media production platform 402 can compare these transcripts in order to generate a master transcript 408 having high accuracy with minimal human involvement. Historically, developers have been responsible for manually correcting errors in transcripts (and, in some cases, in discovering the errors). Here, however, the media production platform 402 can compare transcripts independently generated by different transcription services to identify dissimilar segments (also referred to as "misaligned segments"). The term "misaligned segment," as used herein, refers to a transcribed segment of audio in which the transcription services have different interpretations. Thus, the transcripts acquired by the media production platform 402 will not be in complete agreement with one another in a misaligned segment. In some situations, all of the transcripts include dissimilar interpretations of one or more words spoken in the audio file 404. For example, the transcripts received from three transcription services may have different interpretations of a particular series of words. In other situations, a subset of the transcripts include dissimilar interpretations of one or more words spoken in the audio file. For example, a pair of transcripts received from two transcription services may have the same interpretation of a particular series of words, while the transcript received from a third transcription service may have a different interpretation of the particular series of words.

These misaligned segments may be identified for further consideration by a developer, or these misaligned segments could be analyzed by the media production platform 402 on behalf of the developer. For example, the media production platform 402 may visually highlight the misaligned segment and then cause display of the dissimilar interpretations for review by the developer. As another example, the media production platform 402 may identify a segment of the audio file 404 corresponding to the misaligned segment, and then the media production platform 402 may cause the segment of the audio file 404 to be transcribed again. For instance, the media production platform 402 could send the segment of the audio file 404 to the same set of transcription services, a subset of the transcription services, or one or more new transcription services (i.e., a transcription service that has not yet transcribed the audio file 404). Additionally or alternatively, the media production platform 402 may transcribe the segment of the audio file 404 itself.

FIG. 5 includes an example of a master transcript generated based on multiple transcripts produced by different transcription services. As discussed above, the master transcript may be constructed by a comparison module (also referred to as a "comparison engine"). In the master transcript, words that may be incorrect may be flagged by the comparison module (e.g., so that those words can be highlighted when presented on an interface generated by the GUI module). These incorrect words may be referred to as "misaligned portions" or "misaligned segments" of the master transcript, as further discussed below. Generally, the comparison model determines that a given word may be incorrect based on a determination that there are dissimilar interpretations by different transcription services.

One or more suggested replacements may be populated adjacent to each incorrect word, for example, in parentheses or brackets as shown in FIG. 5. Said another way, for each incorrect word, at least one suggested replacement may be embedded within the master transcript. In some embodiments, the suggested replacement(s) are based on the dissimilar interpretations of the different transcription services. Assume, for example, that the comparison module is tasked with comparing three transcripts generated by three transcription services, two of which agree on the interpretation of a given term. In such a situation, the interpretation by those two transcription services may be shown in the master transcript while the other interpretation may be shown as a suggested replacement. In embodiments where no majority interpretation exists, the comparison module may simply select one interpretation for inclusion in the master transcript. For example, the comparison module may randomly select an interpretation, or the comparison module may choose the interpretation offered by the transcription service that has historically been most successful in properly interpreting audio content. In other embodiments, the suggested replacement(s) are based on analysis of the surrounding terms by a model trained to understand grammar, sentence structure, and the like. If the comparison module determines that the suggested replacement is no word, then the parentheses or brackets may be empty.

Those skilled in the art will recognize that other visual mechanisms could be used in addition to, or instead of, the parentheses shown in FIG. 5. As an example, the master transcript may not include parentheses or brackets that are populated with suggested replacements. Instead, when an individual selects a highlighted word (e.g., by clicking or hovering) viewable on an interface, the suggested replacements may be presented as an overlay feature that proceeds to disappear when either a suggested replacement is selected or the individual interacts with another portion of the interface.

Figure 6:
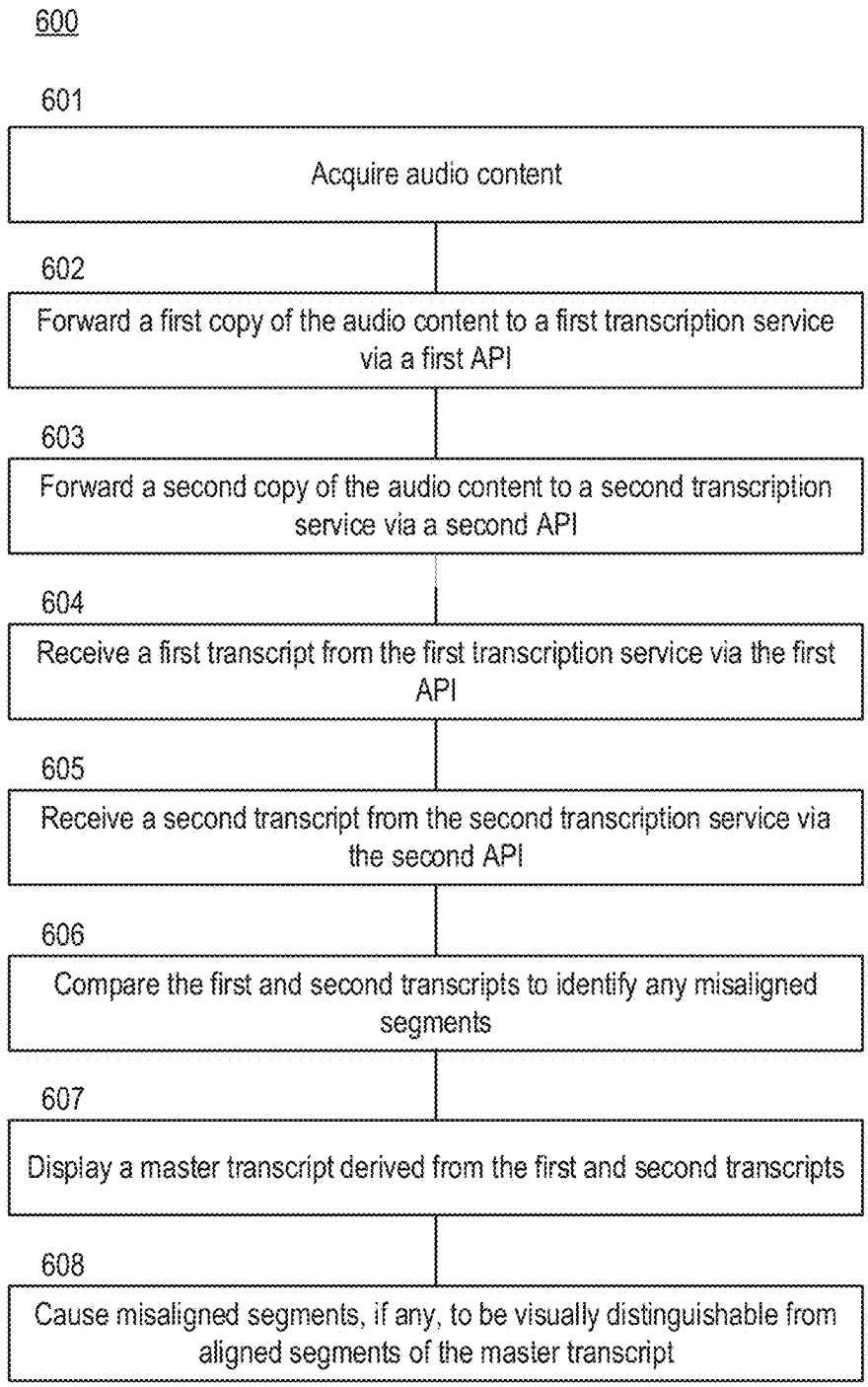
FIG. 6 depicts a flow diagram of a process for creating a master transcript from transcripts independently generated by different transcription services.

FIG. 6 depicts a flow diagram of a process 600 for creating a master transcript from transcripts independently generated by different transcription services. A media production platform can, based on the master transcript, perform actions to facilitate the creation of an experience to be consumed by consumers. For example, the media production platform could be configured to assist in the development of an interactive podcast, guided audio tour, or dynamic radio program for which the master transcript is created.

Initially, a media production platform can acquire audio content (step 601). Generally, the audio content will be uploaded and/or recorded to the media production platform by a developer via an interface accessible on an electronic device. For example, upon receiving input indicative of a selection of audio content for which a master transcript is to be generated, the media production platform may retrieve the audio content from a storage medium. Alternatively, as noted above, the audio content could be automatically retrieved by the media production platform from a storage medium without explicit input from the developer to do so. In some embodiments, the media production platform may process the audio content. For example, the media production platform may apply denoising, filtering, and/or compressing operation(s) upon acquiring the audio content. As another example, the media production platform may strip metadata from the audio content that identifies the source, speaker(s), experience, etc.

In some embodiments, the audio content is representative of the audio file. In other embodiments, the audio content is representative of a video file. In such embodiments, the media production platform could forward copies of the video file to each transcription service, or the media production platform could extract the audio content from the video file and then send copies of the extracted audio content (i.e., without the video content) to each transcription service.

The media production platform can forward a first copy of the audio content to a first transcription service via a first API (step 602). Moreover, the media production platform can forward a second copy of the audio content to a second transcription service via a second API (step 603). Steps 602-603 may be performed simultaneously or sequentially.

Thereafter, the media production platform will receive a first transcript from the first transcription service via the first API (step 604) and a second transcript from the second transcription service via the second API (step 605). Then, the media production platform can compare the first and second transcripts to identify any misaligned segments (step 606). More specifically, the media production platform can programmatically compare the first and second transcripts on a per-word basis in order to identify instances where the first transcription service had a different interpretation than the second transcription service. The first and second transcripts can be compared without a reference transcript that is deemed to be completely accurate. Instead, those segments whose interpretations match between the first and second transcripts can be classified as "correct," while those segments whose interpretations do not match between the first and second transcripts (referred to as "misaligned segments") can be classified as "potentially incorrect." This may be accomplished programmatically. That is, the media production platform may populate a data structure that includes a separate entry for each word included in the first transcript and/or second transcript to indicate whether that word was properly interpreted. This data structure may be referred to as a "tuple." As an example, the media production platform may indicate in a certain field (also referred to as a "spot") in each tuple whether the interpretations are identical or not identical.

A misaligned segment will often correspond to a misinterpretation by each transcription service, though one of the transcription services could have properly interpreted the audio content while the other transcription service improperly interpreted the audio content. Accordingly, the tuple for a given word may comprise a first interpretation by a first transcription service, a second interpretation by a second transcription service, etc. Thus, each word may be associated with an n-tuple that is representative of a sequence of n interpretations, where n is a non-negative integer. The interpretations may be ordered in terms of likelihood of being correct (e.g., as determined based on historical accuracy of the corresponding transcription service), number of similar interpretations (e.g., where two transcription services have the same interpretation while one transcription service has a dissimilar interpretation), etc. In other embodiments, the interpretations are ordered in a predetermined manner based on transcription service (e.g., where the interpretation by a first transcription service always occupies a first field in the tuple, the interpretation by a second transcription service always occupies a second field in the tuple, etc.). In other embodiments, the interpretations are ordered randomly (e.g., in the order in which the transcripts are received from the transcription services). Note that the tuple may further include information regarding part of speech, relation to other words, topic of the audio file, and the like. In the event that multiple interpretations are provided for a given word, this information could be used to establish which of those interpretations is the most likely to be correct. For example, the media production platform may examine the part of speech of the given word (and the parts of speech of surrounding words) to identify the interpretation that is most likely to be correct.

In some embodiments, the media production platform displays a master transcript derived from the first and second transcripts on an interface for review by a developer (step 607). As noted above, the master transcript can include those segments deemed "correct" by the media production platform, as well as the different interpretations of those deemed "potentially incorrect" by the media production platform. Said another way, the master transcript can be comprised of words determined to be interpreted accurately due to their presence in the first and second transcripts. For each misaligned segment, the master transcript can include both interpretations—much like nested conversation options—to indicate that the first and second transcription services interpreted the audio content differently.

The media production platform may cause misaligned segments, if any, in the master transcript to be visually distinguishable from other portions of the master transcript corresponding to aligned segments of the first and second transcripts (step 608). For example, the media production platform may cause the entire portion of the master transcript corresponding to the misaligned segment to be colored. As another example, the media production platform may cause the words of the different interpretations to be rendered in different colors. For instance, word(s) in the portions of the master transcript corresponding to aligned segments of the first and second transcripts may be rendered in black, word(s) in the first interpretation by the first transcription service may be rendered in red, and word(s) in the second interpretation by the second transcription service may be rendered in blue.

Figure 7:
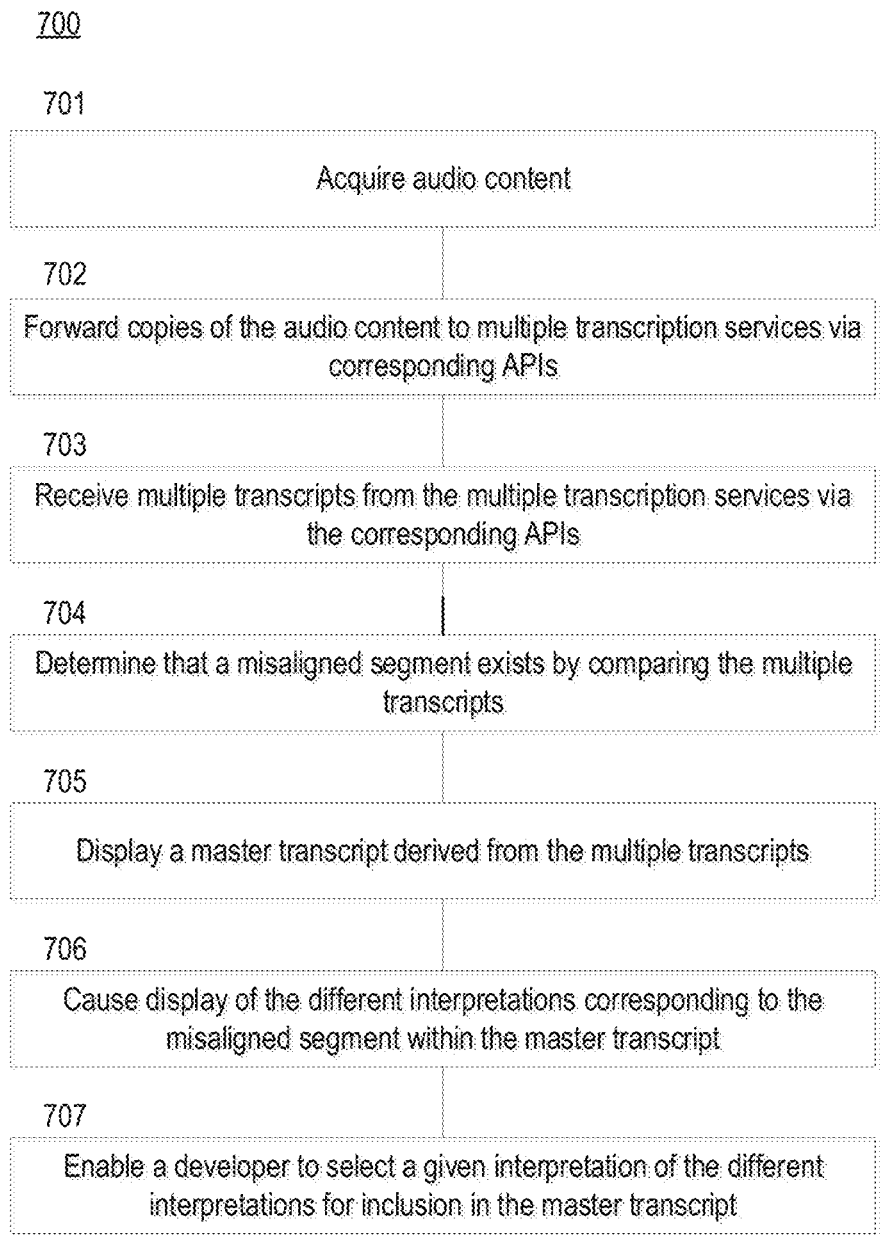
FIG. 7 depicts a flow diagram of a process for addressing misaligned segments of transcripts generated by different transcription services.

FIG. 7 depicts a flow diagram of a process 700 for addressing misaligned segments of transcripts generated by different transcription services. Step 701 of process 700 may be similar to step 601 of process 600. After acquiring the audio content, the media production platform can forward copies of the audio content to multiple transcription services via corresponding APIs (step 702). As noted above, the media production platform could forward copies of the audio content to any number of transcription services. Generally, the media production platform will forward copies of the audio content to a pair of transcription services for several reasons. First, it will conserve the amount of processing resources allocated to transcription (e.g., examining/comparing more than two transcripts may impact the ability of the media production platform to support other functions). Second, a master transcript can be generated with high accuracy from a pair of transcripts (e.g., approximately 97 percent of a pair of transcripts may be aligned). As the number of transcripts to be compared increases, the amount of misalignment will increase, which results in more misaligned segments that must be addressed. The media production platform can receive multiple transcripts from the multiple transcription services via the corresponding APIs (step 703).

The media production platform can compare the multiple transcripts to discover whether any misaligned segments exist. In some instances, the media production platform will determine that a misaligned segment exists based on the comparison (step 704). As discussed above, the misaligned segment may be representative of different interpretations of word(s) spoken in a portion of the audio content. Misalignment in the interpretations can be caused by any number of issues. Some common issues include the interpretation of non-speech utterances (e.g., breath noises) as words, the substitution of homophones, the mispronunciation of acronyms, and the use of unknown acronyms. In some embodiments, the media production platform may indicate (e.g., in the master transcript when shown on an interface) the type of issue that caused the misalignment. Thus, the media production platform may be able to indicate, for example, that a misalignment was caused by misinterpretation of a non-speech utterance or substitution of a homophone.

Thereafter, the media production platform can display a master transcript derived from the multiple transcripts on an interface for review (step 705). Moreover, the media production platform can cause display of the different interpretations corresponding to the misaligned segment within the master transcript (step 706). For example, the media production platform may insert the different interpretations—much like nested conversation options—in line with the remainder of the master transcript to indicate that the section of audio content was interpreted differently. As discussed above, these different interpretations could be visually highlighted in some manner so that the misaligned segment is distinguishable from aligned segments.

In some embodiments, the media production platform enables a developer to select a given interpretation of the different interpretations for inclusion in the master transcript (step 707). Said another way, the media production platform may enable the developer to specify the correct interpretation. For example, the media production platform may permit the developer to select a particular interpretation from amongst the different interpretations. Upon receiving input indicative of a selection of a particular interpretation, the media production platform may insert the particular interpretation within the master transcript and remove the other interpretation(s) from the interface. As another example, the media production platform may permit the developer to replace the different interpretations by typing directly within the master transcript.

Unless contrary to physical possibility, it is envisioned that the steps described above may be performed in various sequences and combinations. For example, the media production platform may support simultaneous editing of multiple master transcripts by a single developer (e.g., via separate windows in a single interface, or via separate tabs in a single workspace).

Other steps may also be included in some embodiments. For example, the media production platform may permit the developer to specify which transcription services should receive a copy of the audio content. Thus, the media production platform may receive input indicative of a selection of at least two transcription services and then either establish communication with APIs associated with those transcription services or ensure that such APIs are accessible. As another example, the media production platform may allow the developer to manually correct inconsistencies by modifying the master transcript directly, as well as select portions of audio content that should be reinterpreted (e.g., by a new transcription service). Thus, the media production platform may receive input indicative of a selection of a portion of the master transcript and then transmit a corresponding portion of the underlying audio content to a transcription service for interpretation. Generally, this transcription service is not one of the transcription services that creates a transcript from which the master transcript is derived. This transcription could be selected by an individual, in which case the media production platform will receive input indicative of a selection of the transcription service, or this transcription service could be automatically identified by the media production platform. For example, the media production platform may select the transcription service from amongst all available transcription services based on its historical accuracy. The transcript received for the corresponding portion of the underlying audio content could then be automatically inserted directly into the master transcript, or the transcript received for the corresponding portion of the underlying audio content could be offered as a suggested replacement.

Processing System

Figure 8:
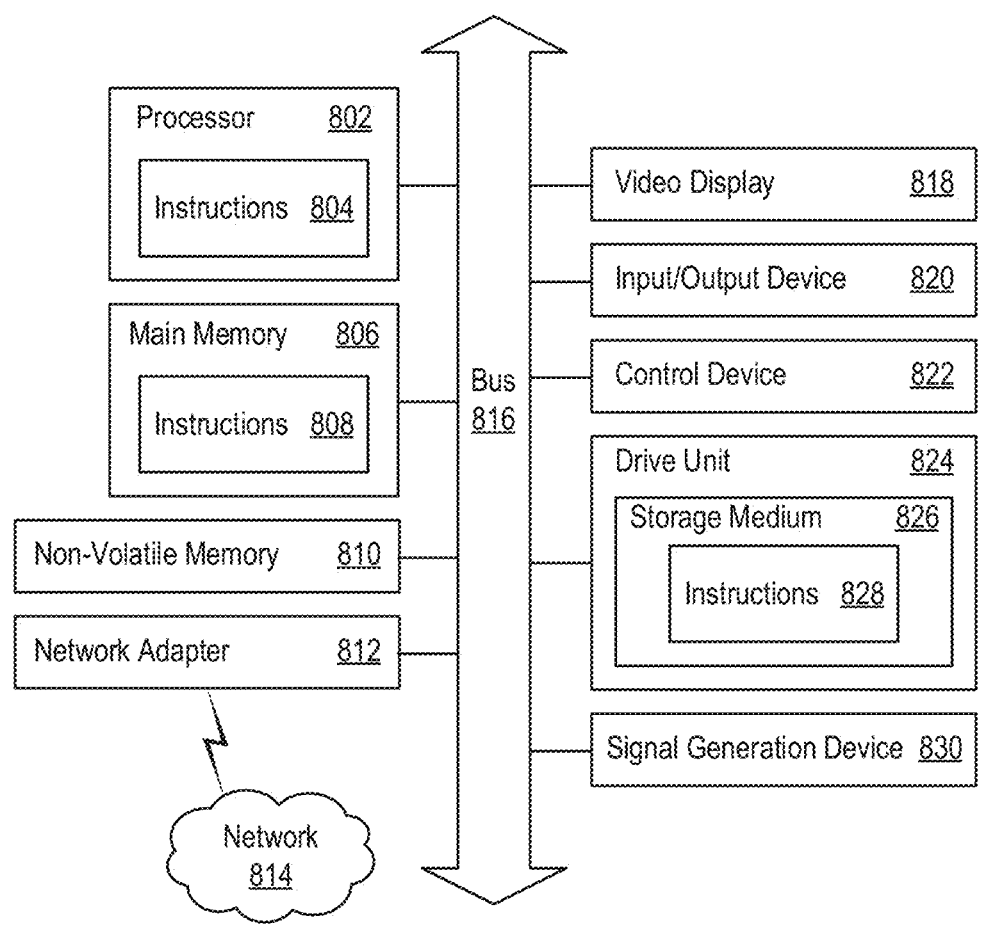
FIG. 8 is a block diagram illustrating an example of a processing system in which at least some operations described herein can be implemented.

FIG. 8 is a block diagram illustrating an example of a processing system 800 in which at least some operations described herein can be implemented. For example, components of the processing system 800 may be hosted on a computing device that includes a media production platform (e.g., media production platform 102 of FIG. 1 or media production platform 210 of FIG. 2).

The processing system 800 may include a processor 802, main memory 806, non-volatile memory 810, network adapter 812 (e.g., a network interface), video display 818, input/output device 820, control device 822 (e.g., a keyboard, pointing device, or mechanical input such as a button), drive unit 824 that includes a storage medium 826, or signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or a bus compliant with Institute of Electrical and Electronics Engineers (IEEE) Standard 1394.

The processing system 800 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 800.

While the main memory 806, non-volatile memory 810, and storage medium 826 are shown to be a single medium, the terms "storage medium" and "machine-readable medium" should be taken to include a single medium or multiple media that stores one or more sets of instructions 826. The terms "storage medium" and "machine-readable medium" should also be taken to include any medium that is capable of storing, encoding, or carrying a set of instructions for execution by the processing system 800.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memories and storage devices in a computing device. When read and executed by the processor 802, the instructions cause the processing system 800 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 810, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a processor included in a computing device, the method comprising:
   receiving input indicative of a selection of an audio file;
   retrieving the audio file from a storage medium;
   forwarding
      a first copy of the audio file to a first transcription service via a first application programming interface, and
      a second copy of the audio file to a second transcription service via a second application programming interface;
   receiving
      a first transcript from the first transcription service via the first application programming interface, and
      a second transcript from the second transcription service via the second application programming interface;
   producing, based on an analysis of the first and second transcripts, a tuple for each word uttered in the audio file, so as to create a series of tuples that are populated into a data structure,
      wherein each tuple includes a field in which it is indicated whether interpretations of a corresponding word across the first and second transcripts are identical;
   identifying a discrepancy by examining the data structure to identify a conflicting translation between the first and second transcripts,
      wherein the conflicting translation corresponds to a portion of the audio file for which the first transcription service had a first interpretation and the second transcription service had a second interpretation;
   applying, to the first and second interpretations, a computer-implemented model that addresses the discrepancy by identifying an appropriate translation for the conflicting translation from among the first and second interpretations,
      wherein upon being applied to the first and second interpretations, the computer-implemented model analyzes grammar or sentence structure, of the first interpretation and surrounding words and of the second interpretation and the surrounding words, to identify the appropriate translation;
   generating a master transcript, with the appropriate translation identified by the computer-implemented model, based on the data structure; and
   causing display of the master transcript in such a manner that (i) the appropriate translation is visually distinguishable from a remainder of the master transcript and (ii) an alternative translation is positioned adjacent to the appropriate translation in line with the master transcript,
      wherein the alternative translation is whichever of the first and second interpretations is not identified as the appropriate translation.

2. The method of claim 1, further comprising:
   receiving second input indicative of the alternative translation; and
   replacing, in response to receiving the second input, the appropriate translation with the alternative translation in the master transcript.

3. The method of claim 1, wherein each tuple further includes a pair of fields in which the interpretations of the corresponding word across the first and second transcripts are populated in a predetermined order.

4. The method of claim 1, wherein the storage medium is accessible to the processor via a network.

5. A non-transitory computer-readable medium with instructions stored thereon that, when executed by a processor of a computing device, cause the computing device to perform operations comprising;
   determining that a master transcript is to be generated for an audio file;

forwarding a separate copy of the audio file to each of multiple transcription services via a corresponding application programming interface;
acquiring multiple transcripts by obtaining a separate transcript from each of the multiple transcription services via the corresponding application programming interface;
populating, based on an analysis of the multiple transcripts, a tuple for each word uttered in the audio file, so as to create a series of tuples that are populated into a data structure in temporal order,
wherein each tuple includes multiple fields in which interpretations of a corresponding word across the multiple transcripts are populated in a predetermined order;
identifying, based on analysis of the data structure, a word in the master transcript for which a first transcript of the multiple transcripts has a first interpretation and a second transcript of the multiple transcripts has a second interpretation different than the first interpretation;
employing a model that identifies an appropriate interpretation for the word from among the first and second interpretations based on an analysis of grammar or sentence structure, of the first interpretation and surrounding words and of the second interpretation and the surrounding words; and
causing display of the master transcript on an interface in such a manner that the first and second interpretations are presented in line with the master transcript.

6. The non-transitory computer-readable medium of claim 5, wherein said determining comprises establishing that input indicative of a selection of the audio file has been received.

7. The non-transitory computer-readable medium of claim 5, wherein the word is visually distinguishable from words for which the interpretation is identical across the multiple transcripts.

8. The non-transitory computer-readable medium of claim 5, wherein the operations further comprise:
indicating, on the interface, a type of issue responsible for the nonidentical interpretation of the word.

9. The non-transitory computer-readable medium of claim 8, wherein the type of issue is misinterpretation of a non-speech utterance, substitution of an acronym, mispronunciation of an acronym, or misuse of an acronym.

10. The non-transitory computer-readable medium of claim 5, wherein the operations further comprise:
receiving input indicative of a selection of the multiple transcription services.

11. The non-transitory computer-readable medium of claim 10, wherein the operations further comprise:
for each of the multiple transcription services,
initiating, in response to said receiving, a connection with the corresponding application programming interface.

12. The non-transitory computer-readable medium of claim 10, wherein the operations further comprise:
receiving input indicative of a selection of a portion of the master transcript;
identifying a portion of the audio file that corresponds to the selected portion of the master transcript; and
forwarding the portion of the audio file to a transcription service that is not one of the multiple transcription services.

13. The non-transitory computer-readable medium of claim 5, wherein each tuple further includes a field in which it is indicated whether the interpretations of the corresponding word are identical.

14. The non-transitory computer-readable medium of claim 13, wherein said identifying comprises establishing that in a given tuple corresponding to the word, the field indicates that the first and second interpretations are not identical.

15. A method comprising:
forwarding, by a media production platform, separate copies of an audio file to a pair of transcription services;
receiving, by the media production platform from the pair of transcription services, a pair of transcripts for the audio file,
wherein each of the pair of transcripts is representative of an interpretation of the audio file by a corresponding one of the pair of transcription services;
populating, by the media production platform using the pair of transcripts, a tuple for each word uttered in the audio file, so as to create a series of tuples that are populated into a data structure,
wherein each tuple includes a pair of fields in which interpretations of a corresponding word across the pair of transcripts are populated, and
wherein each tuple includes a field in which it is indicated whether the interpretations of the corresponding word are identical;
deriving, by the media production platform using the data structure, a master transcript for the audio file;
identifying, by the media production platform based on an analysis of the data structure, a word in the master transcript for which a first transcript of the pair of transcripts has a first interpretation and a second transcript of the pair of transcripts has a second interpretation different than the first interpretation;
employing a model that identifies an appropriate interpretation for the word from among the first and second interpretations based on an analysis of grammar or sentence structure, of the first interpretation and surrounding words and of the second interpretation and the surrounding words; and
posting, by the media production platform, the master transcript to an interface,
wherein for each word for which the interpretation is not identical in the pair of transcripts,
(i) that word is made visually distinguishable from words for which the interpretation is identical in the pair of transcripts,
(ii) that word is associated with at least one alternative interpretation that is positioned adjacent that word in line with the master transcript, and
(iii) that word is made engageable such that a user is able to replace that word with an alternative interpretation via selection of the alternative interpretation.

16. The method of claim 15, wherein each copy of the audio file is forwarded via an application programming interface that handles communication between the media production platform and the corresponding transcription service.

17. The method of claim 15, further comprising:
receiving, by the media production platform, input indicative of a selection of a portion of the master transcript;
identifying, by the media production platform, a portion of the audio file that corresponds to the selected portion of the master transcript; and forwarding, by the media production platform, the portion of the audio file to a third transcription service.

18. The method of claim 17, further comprising:
receiving, by the media production platform from the third transcription service, a third transcript for the portion of the audio file; and
replacing, by the media production platform, the selected portion of the master transcript with the third transcript.

19. The method of claim 17, further comprising:
receiving, by the media production platform, second input indicative of a selection of the third transcription service.

20. The method of claim 17, wherein the third transcription service is automatically identified by the media production platform responsive to receiving the input.

* * * * *